(12) United States Patent
Weicher

(10) Patent No.: US 7,069,591 B1
(45) Date of Patent: Jun. 27, 2006

(54) SYSTEM FOR ENCRYPTING DATA FILES OF APPLICATION PROGRAMS

(76) Inventor: Neil Weicher, 202 Ocean Dr. East, Stamford, CT (US) 06902

( * ) Notice: Subject to any disclaimer, the term of this patent is extended or adjusted under 35 U.S.C. 154(b) by 0 days.

(21) Appl. No.: 09/532,269

(22) Filed: Mar. 22, 2000

(51) Int. Cl.
*G06F 11/00* (2006.01)

(52) U.S. Cl. ............................ 726/26; 726/6; 726/30; 726/28

(58) Field of Classification Search ............ 713/193, 713/165, 167, 169, 170, 171, 178; 726/5–6, 726/26–28, 30
See application file for complete search history.

(56) References Cited

U.S. PATENT DOCUMENTS

| | | | | |
|---|---|---|---|---|
| 4,503,287 A * | 3/1985 | Morris et al. | ................ | 380/45 |
| 5,557,678 A * | 9/1996 | Ganesan | .................... | 380/282 |
| 5,699,428 A * | 12/1997 | McDonnal et al. | ......... | 713/165 |
| 5,748,735 A * | 5/1998 | Ganesan | .................... | 713/165 |
| 5,796,825 A | 8/1998 | McDonnal et al. | ............ | 380/4 |
| 5,862,325 A * | 1/1999 | Reed et al. | ................. | 709/201 |
| 5,953,419 A * | 9/1999 | Lohstroh et al. | ............ | 713/165 |
| 5,963,642 A | 10/1999 | Goldstein | .................... | 380/4 |
| 6,023,506 A | 2/2000 | Ote et al. | .................... | 713/165 |
| 6,141,698 A * | 10/2000 | Krishnan et al. | ........... | 719/331 |
| 6,157,723 A * | 12/2000 | Schultz | ....................... | 380/273 |
| 6,185,681 B1 * | 2/2001 | Zizzi | .......................... | 713/165 |
| 6,314,190 B1 * | 11/2001 | Zimmermann | .............. | 380/282 |
| 6,330,675 B1 * | 12/2001 | Wiser et al. | ................ | 713/189 |
| 6,381,696 B1 * | 4/2002 | Doyle | ........................ | 713/156 |
| 6,948,069 B1 * | 9/2005 | Teppler | ..................... | 713/178 |
| 2001/0044901 A1 * | 11/2001 | Grawrock | .................. | 713/189 |

OTHER PUBLICATIONS

Menezes, Alfred et al., Handbook of Applied Cryptography, 1997, CRC Press LLC, pp. 550.*
Article by Matt Blaze entitled, "Key Management in an Encrypting File System", Jun. 1994, USENIX Summer 1994 Technical Conference, Boston, MA.
Article by Matt Blaze entitled, "A Cryptographic File System for Unix", Nov. 1993, Proceedings of the First ACM Conference on Computer and Communications Security, Fairfax, VA.

* cited by examiner

*Primary Examiner*—Norman M. Wright
(74) *Attorney, Agent, or Firm*—St. Onge Steward Johnston & Reens LLC

(57) ABSTRACT

A system for encrypting data files of application programs is provided. The system includes a security file for encrypting and decrypting data files and for launching software applications. The invention further operates automatically without user intervention and as an addition to existing applications, whereby said applications need not be modified. The invention further decrypts data files only in the computer's memory and is capable of backing up data files to a remote location and tracking changes made to files.

18 Claims, 5 Drawing Sheets

SYSTEM FOR ENCRYPTING DATA FILES OF APPLICATION PROGRAMS

FIELD OF THE INVENTION

The invention relates to a system for encrypting and dynamically decrypting data files of application programs. More particularly, the invention relates to a system for encrypting and/or decrypting an application's data files without user intervention and without modifying the application program.

BACKGROUND OF THE INVENTION

Computers have fast become a common tool used by companies and industries to conduct business activities. Further, computers have affected almost every aspect of how businesses are run and are used not only by high-level decision makers, but also by secretaries and shipping clerks. Management may use computers to store important client contacts while secretaries may use computers to store documents and spreadsheets. In addition, human resources may use computers to store employee records and payroll. As one can see, computers can affect a large part of how businesses function. As computer use has expanded, so has the need to store computer files generated by company personnel. Hence, network drives were developed to help workers store vast amounts of data files and by networking a company's computers together, workers can generally access the files from different computers throughout the company and even from remote locations.

Because many departments within a company store their data files, some of them confidential, on the same network as other departments, one who has access to the network may also have access to all the data files stored on it. Hence, a shipping clerk may have access to confidential employee records if both are stored on the network drive and this would be undesirable. Therefore, it is desired to restrict access to certain files only to authorized users. One way to do this is to load the software applications that are typically used to access the files only on authorized users' computers. For example, load the text processing software application Word® only on secretaries' computers. Without Word® loaded on a shipping clerk's computer, he should not be able to read a Word® file. However, one can still access the Word® files, without using the Word® software application, through the use of other applications, such as the application WordPerfect® or simply by loading Word® onto his or her computer.

Also known in the art of computer software applications are various methods for restricting access to certain users by requiring authorized users to enter a password in order to log on, or enter, a computer system. Likewise, certain applications can also be restricted by password as well. By requiring a password, not only is the application restricted, but, theoretically, so are the data files created by the application that can be retrieved once the user has successfully logged into the application.

Controlling access rights to certain files, directories, and drives on the network, however, can be unwieldy to manage and may be secure but prevents access by some who might do work. Usually, access rights are set up by password but are often notoriously insecure with users selecting their phone numbers, pets' names, or children's names as passwords. Further, some users may also tape their passwords to the monitors or desks, or keep the passwords in their desk drawers.

Network security problems are exacerbated by the rise of the Internet since virtually everyone on the Internet theoretically may have access to every file stored on every computer with Internet access. The Internet has also given rise to heightened privacy concerns throughout the computer industry. Governments throughout the world, particularly the United States and Europe, have or are considering various pieces of legislation to protect consumer privacy.

In order to restrict access rights or put security measures in place, developers may need to modify their software applications. This may be complicated and difficult when the applications have been substantially completed because the developers may need to rewrite vast portions of the applications' source codes in order to incorporate the added security measures. Furthermore, developers may need to hire new programmers with special skills in areas such as encryption. End users, such as companies, may also need to retrain employees who are affected by the changes in the application source codes for these changes may affect the way the applications are used.

Once security measures and/or access rights are installed, only authorized users should theoretically be able to access the files in prior systems. However, unauthorized users may still be able to access protected data files if such files are decrypted using traditional methods. One such method would be for an encrypted file to be copied to a temporary directory, whereby the user can then edit the temporary file. Once the user saves changes to the file, the file is then reencrypted. However, the temporary file is left unencrypted and accessible to unauthorized users during the entire period it is being used.

With other known encryption methods, users have had to repeatedly designate each file to be encrypted and/or decrypted. This included newly created files and old files that were edited. With this kind of involvement, users may neglect or forget to reencrypt a file that was recently decrypted for editing purposes. In addition, while designating multiple files to be encrypted, users may inadvertently encrypt a file that is meant to be unencrypted. As one can see, human error and time pressures may frustrate a company's desire for protecting files.

Further, many software developers may desire to add data security and/or encryption to their existing software applications in the form of an add on feature that allows security to be added without modifying the existing applications. This add on feature enables developers to simply and easily enhance their products without modifying an application's source code. This add on security feature may also appeal to end users, such as companies, who want to add security measures to their existing applications without having to retrain employees or hire computer programmers to modify the applications.

In addition to securing data files, end users may also want to back them up, or copy them, in the event the original files are accidentally lost or destroyed. However, not all back up systems can provide copies of the destroyed data files. For example, in the unfortunate event that the building is destroyed by fire, it is likely that any backed up copies stored in the building will be destroyed along with the original files. It may also be beneficial to provide a way of backing up files as an add on feature that can be added to existing applications without the need to modify them.

Further, other add on features may be provided such as a way of tracking and auditing modifications to files. This add on feature would be able to identify who made the modifications, when they occurred, and what kinds of modifications were made.

What is desired, therefore, is to create a system for encrypting data files of application programs without placing unencrypted copies of the files on a storage device, without modifying the application program itself, and without requiring user intervention. It is also desired to create a system for adding features to application programs, such as encrypting/decrypting and/or backing up an application's data files, preferably to a remote location. It is further desired to create a system capable of tracing and auditing file modifications.

SUMMARY OF THE INVENTION

Accordingly, it is the object of this invention to provide a system for decrypting data files of application programs without placing an unencrypted copy of the file on a storage device.

Another object is to provide a system for encrypting and/or decrypting an application's data files without user intervention.

A further object is to provide a system for encrypting and/or decrypting an application's data files without modifying the application program.

Still another object of the invention is to provide a system which decrypts application data files in memory only.

Yet a further object is to provide a program that allows developers and/or end users, such as companies, to add features to existing applications without the need to modify the application or retrain users.

These and other objects of the invention are achieved by a system for encrypting data files comprising a computer, storage device connected to the computer, an application loaded on the computer for storing and retrieving data files on the storage device, and a program that intercepts the data files to be stored by the application on the storage device and encrypts them before they are stored. The system executes on the computer as an addition to existing applications and does not require modifications to the applications. Further, the system executes automatically without user intervention. As an added feature, the system allows for data files to be backed up to another storage device, which may be in a remote location and/or a location that allows users at multiple locales to have access to them.

The system generates a security file that specifies the application programs, data files to be encrypted, and encrypt key needed to decrypt the data files. As an added security measure, the security file is further encrypted with a passkey not known by anyone. When decrypting data files, the system does so directly in the workstation's memory, thereby eliminating unencrypted copies of data files from being created.

DETAILED DESCRIPTION OF THE DRAWINGS

Figure 1:
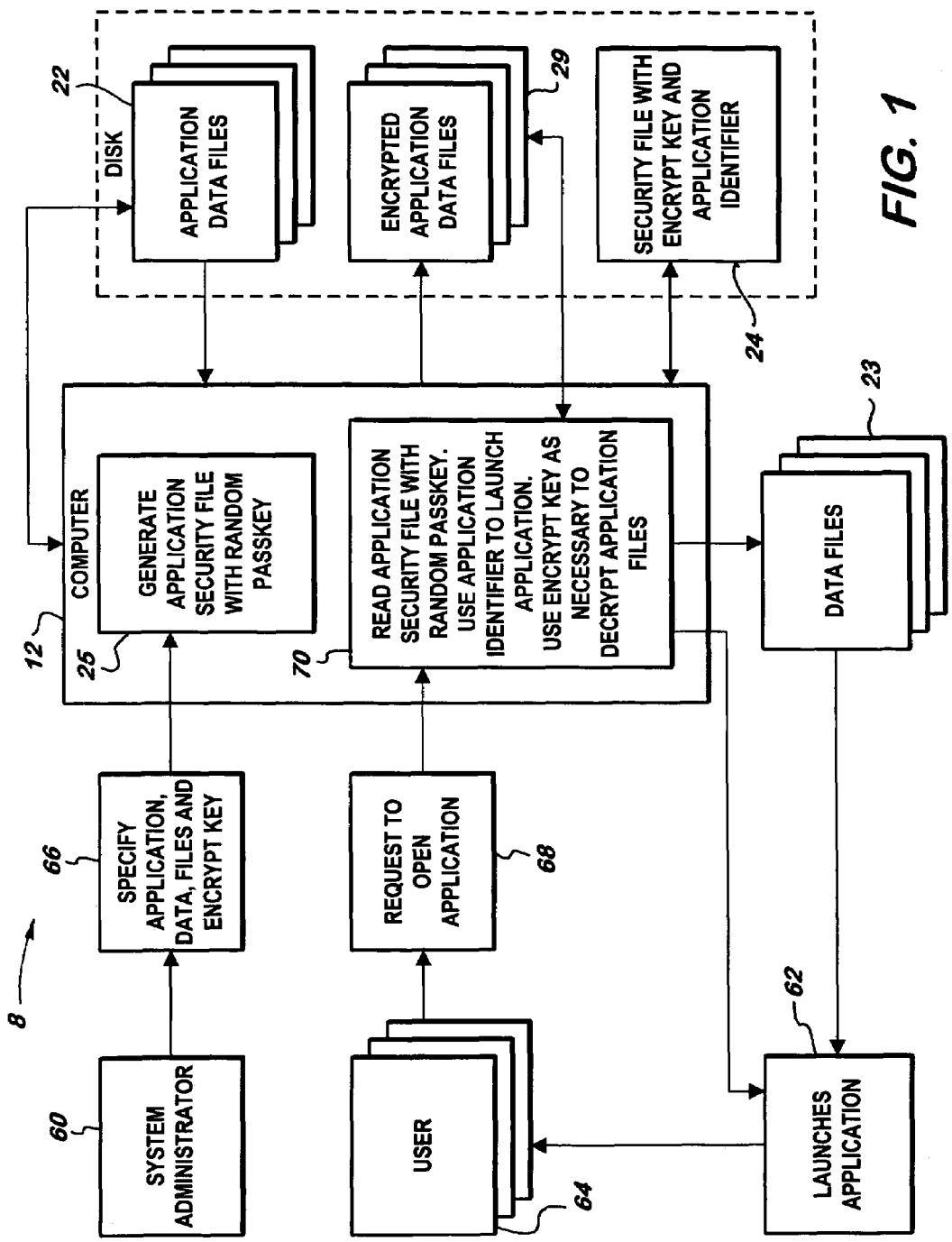
FIG. 1 is a schematic block diagram of the system for encrypting data files of application programs in accordance with the invention.

FIG. 1 depicts a system 8 and method for encrypting data files 22 comprising a computer 12, a storage device, an application, and a program.

The storage device includes any medium where files can be stored including a computer's hard drive, another internal drive, an external drive, a floppy drive, or a backup drive such as a zip or jazz drive. Further, suitable dives are not limited to magnetic drives but may also optical drives, tape drives, volatile or non-volatile drives. Most types of storage devices will suffice for the purposes of the invention because they generally serve the same underlying purpose, to provide a medium to store data files 22.

The system 8 encrypts and decrypts data files 22, which include entire files or portions of files. Meaning the invention is capable of reading entire files and portions of files, or records, and then encrypting, decrypting, and reencrypting the desired parts.

The application should be one that is capable of storing and retrieving data files 22 stored on said storage device. This includes a broad range of applications for most, if not all, applications are capable of storing and retrieving files including, but not limited to, Word®, Excel®, ACCESS®, and CADKEY®. In addition to the above, which are generic and commonly sold in stores, the application may also be one that is customized to a customer's specific requirements and is generally written by a computer programmer hired by the customer. For example, companies routinely hire independent contractors or outside consulting firms to write applications useful only to the company's particular line of products. Whether the application is a stock item or customized program, the end user or customer, would probably not be familiar with nor interested in writing or modifying a computer source code to accomplish their changing needs but will likely buy another application or hire another computer programmer.

Further, vast differences among the various applications will not affect the use of system 8 because it is written to be added to existing applications and not integrated with the applications' source codes. In effect, an application's computer language is not relevant to the invention's operation. Therefore, the way the application is used by the end user has not changed because the invention does not modify the application. This benefits the end user for companies do not need to retrain employees or hire outside consultants to reprogram the application and this increases the viability of system 8.

Figure 2:
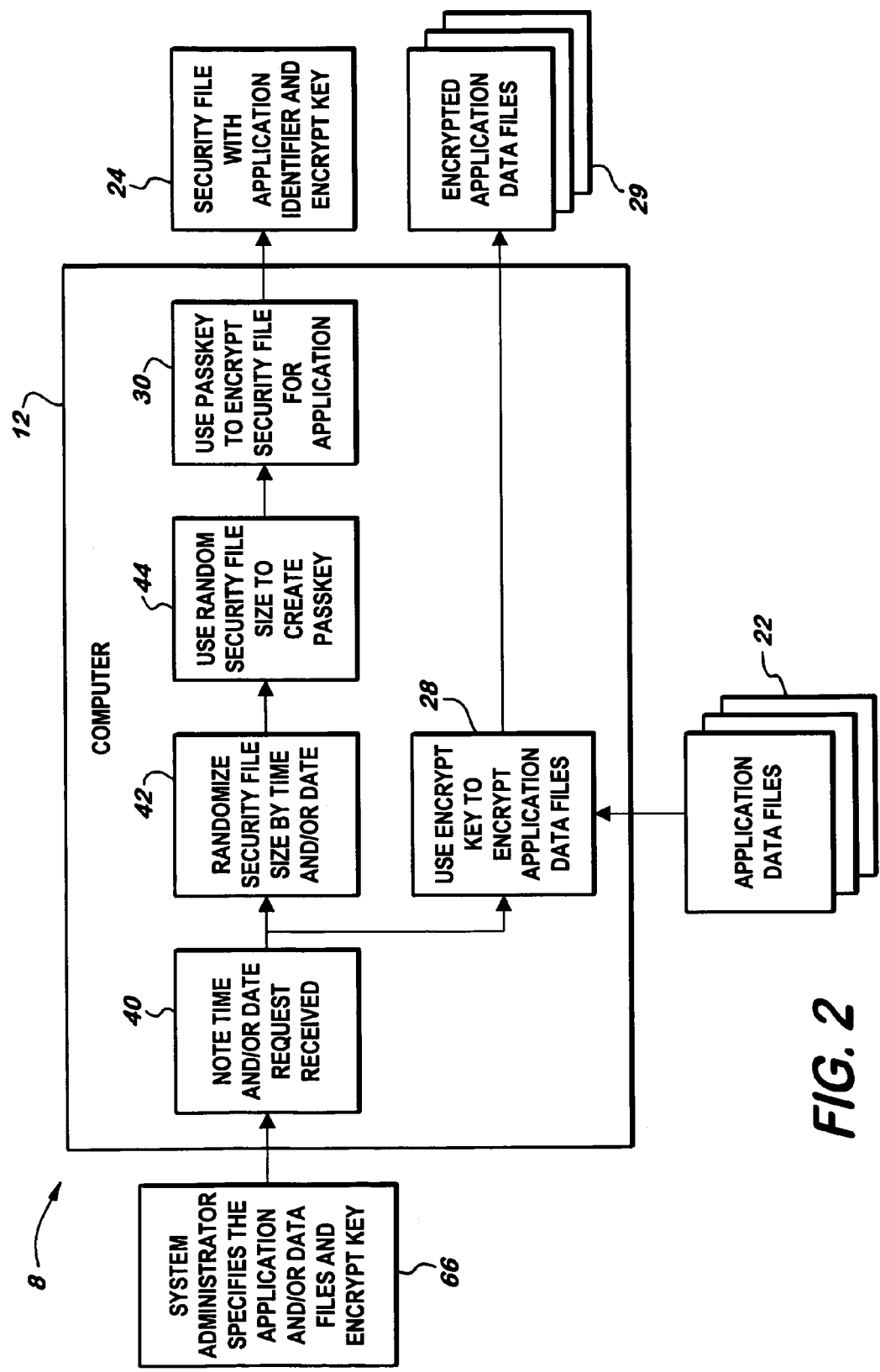
FIG. 2 is a schematic block diagram illustrating the encryption of data files and the creation of a security file to set up the system of FIG. 1 for use.

System 8 encrypts data files 22 by intercepting them before they are stored on the storage device by the application. System 8 knows which files to intercept and encrypt because, prior to encryption, system administrator 60 specifies 66 application identifier 26, which specifies to computer 12 which application to launch 62, data files 22 to be intercepted for encrypting and decrypting, and encrypt key 28, needed for encrypting and decrypting data files 22, to system 8. Thereafter, system 8 generates 25 security file 24 to contain these specifications, which will be accessed each time data files 22 are to be encrypted or decrypted. System 8 will be able to determine which files are to be encrypted before they are saved and which files require encrypt key 28 in order to be decrypted. FIG. 2 more particularly depicts the encryption of data files 22 and creation of security file 24.

Figure 4:
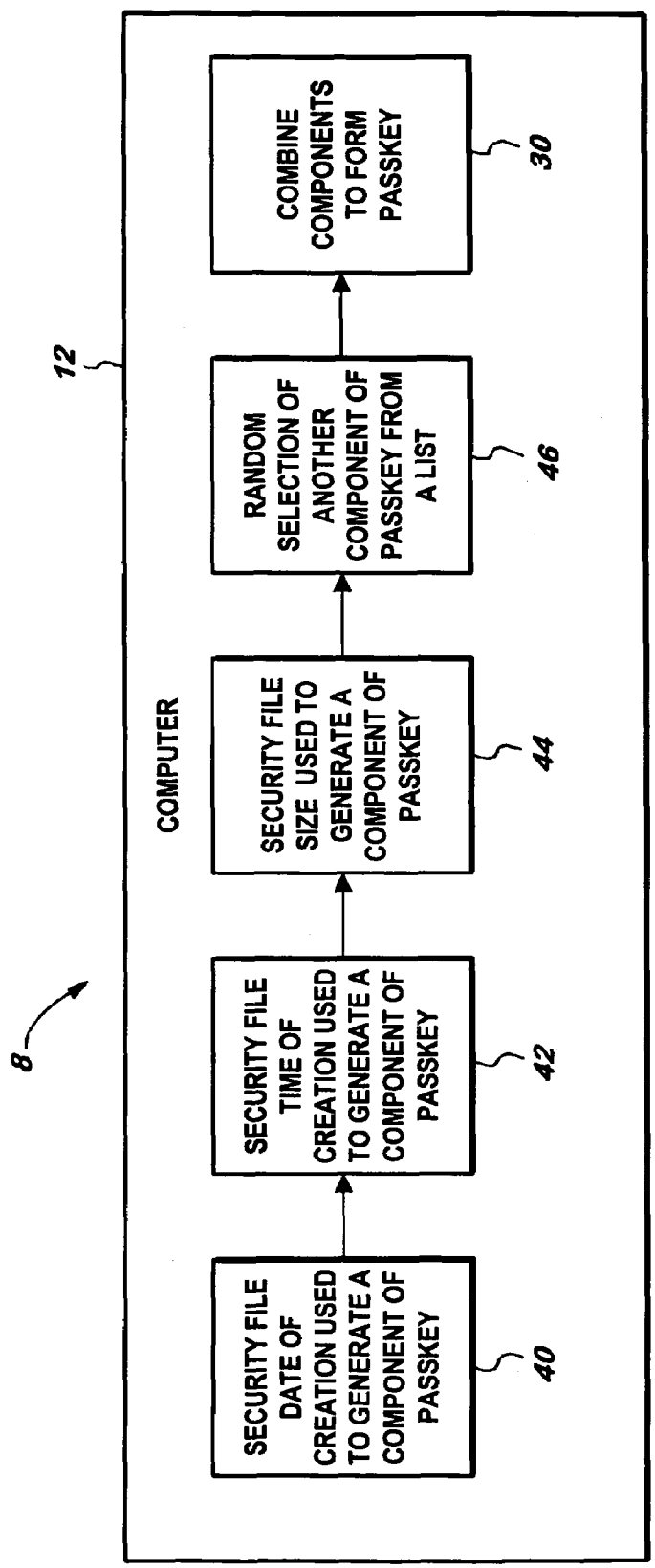
FIG. 4 is a schematic block diagram illustrating encryption of the application security file with a randomized passkey.

Because security file 24 contains encrypt key 28, which is the password for encrypting and decrypting data files 22, security file 24 may be the target of computer hackers looking to gain unauthorized access to the protected files. Therefore, security file 24 may also desirably be encrypted. Security file 24, as illustrated by FIG. 2, is encrypted by passkey 30. Passkey comprises a combination of the security file's size, time of creation, date of creation, and finite list of possible passkeys. Passkey 30 may further use one or more components in unspecified amounts. It is this unpredictability in determining the components of passkey 30 that makes it desirable to encrypt security file 24. FIG. 4 more particularly depicts encryption of security file 24 with passkey 30.

Figure 3:
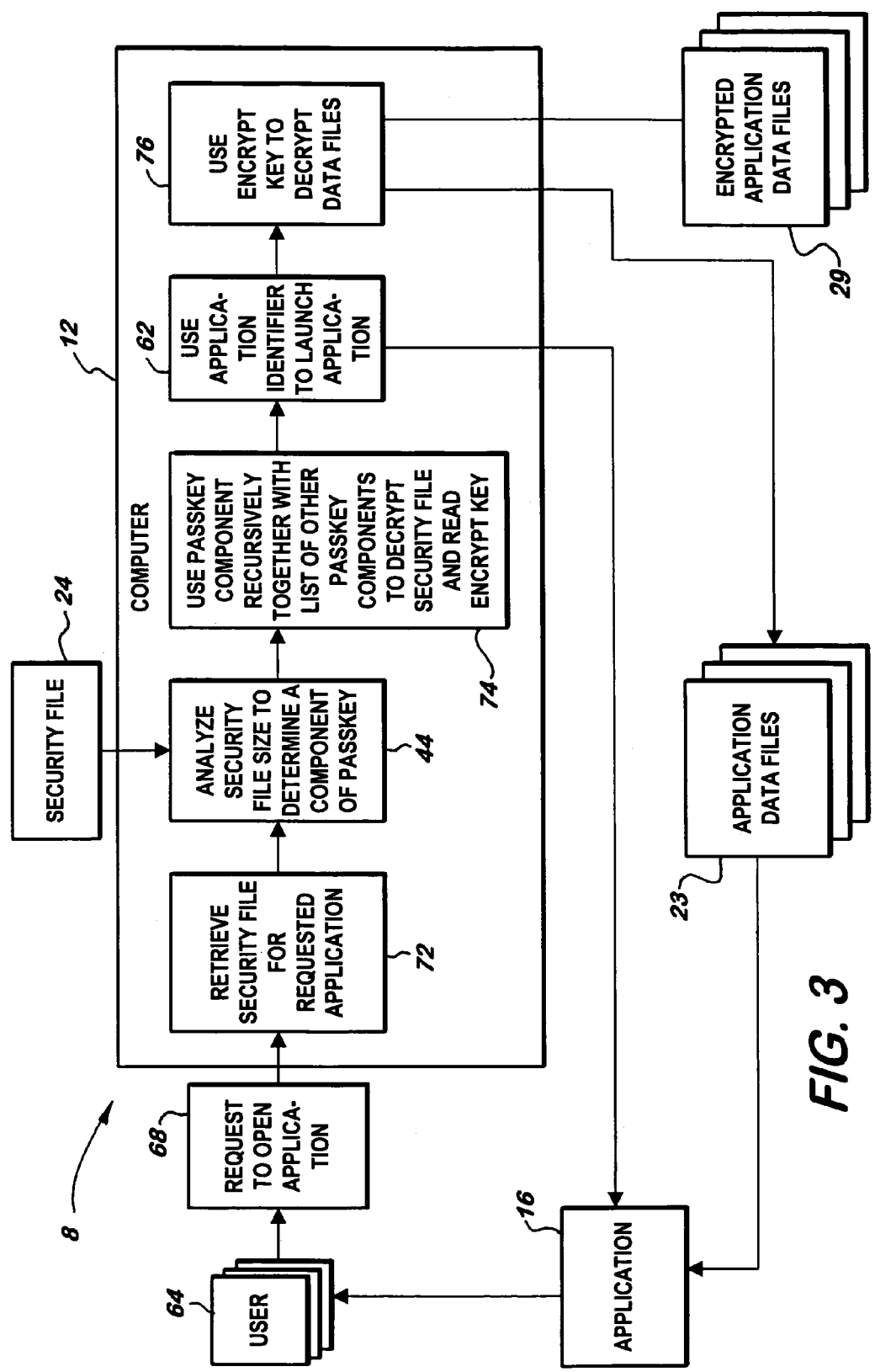
FIG. 3 is a schematic block diagram illustrating use of the system of FIG. 1 to retrieve encrypted and non-encrypted data files upon user request through the applications.

Upon user request 68 to open an application and retrieve files, system 8 will launch application 62 and determine 70 whether the files requested are encrypted or not. If the requested files are encrypted, system 8 automatically decrypts security file 24 with passkey 30 and subsequently reads and uses encrypt key 28 to decrypt data files 29. If the requested files are not encrypted, system 8 launches application 62 and retrieves data files 22 without using encrypt key 28. FIG. 3 more particularly depicts the use of the system for encrypting data files.

It should be noted that system 8 operates automatically without user intervention. No user input is needed for system 8 to function properly and this includes encrypting and decrypting files. In addition, system 8 runs hidden from the user and is not visible on the computer screen. Hence, when a user saves a file, system 8 automatically begins and determines whether the file is to be encrypted and, if so, system 8 encrypts said file. Likewise, upon a request to retrieve a file, system 8 automatically decrypts the file and sends it to the user. The user cannot tell, visually or otherwise, that the invention is even there, let alone operating.

In addition, system 8 retrieves and decrypts data files 23 in memory. Meaning the requested files are decrypted in the local computer's memory and sent to the user 64. At no time is the file decrypted on a disk or a temporary directory where an unencrypted copy of the file would be created.

FIG. 2 depicts the encryption of data files 22 and the creation of the security file 24 to set up the system of FIG. 1 for use.

System 8 would need a system administrator to specify 66 certain criteria in order for it to know which files or kinds of files to encrypt. At a minimum, the system administrator would specify application identifier 26 and encrypt key 28. Encrypt key 28 is arbitrarily determined by the system administrator. To have the program automatically encrypt files, the system administrator would need to specify the data files to be encrypted. The data files may be selectively chosen to include some or all files associated with the application. Further, once the kinds of files have been specified, system 8 would thereafter encrypt all future files of that kind. This means, for example, the system administrator would not need to specify a newly created Word® document to the program every time a new document is created, which may occur daily. This facilitates the use of the invention for, otherwise, the system administrator would be constantly specifying new files to the program.

After the criteria have been specified, system 8 generates security file 24 to contain all the specified criteria and security file 24 is accessed each time a file is encrypted or decrypted because system 8 encrypts and decrypts dynamically. This dynamic encryption and decryption allows system 8 to operate without creating copies of files in a temporary directory, whereby such copies would be unencrypted. System 8 would decrypt files in the workstation's memory. After a user edits and saves the file, system 8 would reencrypt it with encrypt key 28 by intercepting the file before it is sent the storage device. In addition, system 8 can intercept the files for other/additional purposes prior to storage.

Because security file 24 contains encrypt key 28, which is necessary for the invention to work properly, security file 24 may be the target of computer hackers looking for the encrypt key to unlock the protected files. Therefore, system 8 further encrypts the security file 24 with passkey 30. Passkey 30 comprises one or more components. Please refer to FIG. 4 for a more detailed description of the encryption of the passkey 30.

FIG. 3 depicts the use of the system of FIG. 1 to retrieve encrypted and non-encrypted data files 22 upon user request.

Upon user request 68 to open an application 16 and retrieve an encrypted data file 29, the program automatically retrieves 72 the security file and passkey 30 to decrypt 74 the security file. System 8 is the only entity that knows passkey 30. Not even the system administrator knows it. Once security file 24 is decrypted, system 8 then reads encrypt key 28 and application identifier 26. System 8 then uses application identifier 26 to launch 62, or open, the application. Next, system 8 decrypts 76 the requested data file 23 in the computer's memory and not on a disk, or temporary directory, and opens the file through the application. The decrypted file is now before the user for his or her use.

It should be noted that the system encrypts and decrypts automatically without user intervention. Further, the system operates in a manner that cannot be detected visually or otherwise by the user. For example, if the user normally begins an application by double clicking an icon, the application's path would be redirected to go through the system before being opened for the user. However, the redirected path in which the application is opened is transparent to the user for the application he requested has been opened in the same manner.

FIG. 4 depicts the encryption of a security file with a passkey. The purpose of passkey 30 is to encrypt security file 24, which would provide a secondary security measure to data files 22 that are already encrypted with encrypt key 28.

To further provide protection to security file 24, passkey 30 is comprised of one or more components. Further, passkey 30 may use a varying amount of each component. As one can see, the unpredictability as to what components are used to form the passkey can be characterized as random. Hence, passkey 30 is a randomized passkey.

The components that are possibly used by program 20 to form passkey 30 are as follows: date 40 the security file was created, time 42 the security file was created, file size 44 of the security file, and list 46 of possible passkeys.

Figure 5:
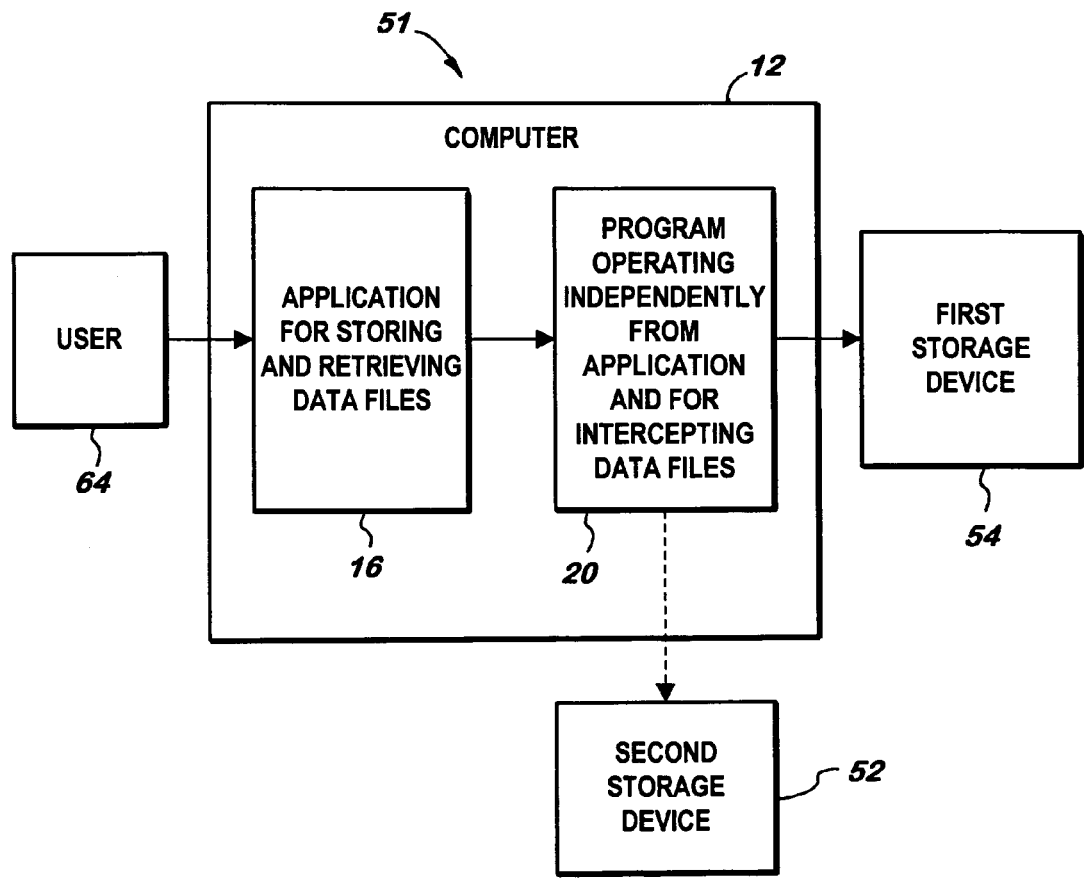
FIG. 5 is a schematic block diagram of another embodiment of the invention of FIG. 1 in which files of application programs are intercepted for other/additional purposes prior to storage.

FIG. 5 is a schematic block diagram of another embodiment of the invention of FIG. 1 in which files of application programs are intercepted for other/additional purposes prior to storage. Besides encryption and decryption, the invention can further add other features to existing applications, such as a system 51 for replicating or backing up data files to second storage device 52 which may be located at a remote location. A remote location is any location apart from first storage device 54. Second storage device 52 may be adjacent from first storage device 54 or they may be further apart, such as in different rooms, in different buildings, or in different countries. Second storage device 52 would not replace first storage device 54, but would operate in addition to the latter. Replicating, backing up, or copying files are generally useful when the original files are accidentally erased or lost and/or when users at multiple locations need access to the data files.

However, not all end users keep the backed up copies in a location that is safe and this defeats the purpose for making the backed up copies. For instance, an end user may keep the copies on floppy disks in the same computer room as the original files. Because back up copies are generally made often, end users find it more convenient to keep the backed up copies within easy reach in order to overwrite the older versions. But by keeping the copies in the same area as the original files, all files would be lost if there was a fire or temperature problem in the room where moisture corrupted all the computer disks and files.

Therefore, system 51 provides a program 20 to back data files up to a second storage device which may be in a remote location outside the office. For example, system 51 could back files up to any type of storage device or the Internet. Further, the backed up copies can also be secured by encrypting and decrypting them the same way system 8 of FIG. 1 encrypts and decrypts data files 22. This includes a system for intercepting the copied files for encryption and other/additional purposes prior to storage on second storage device 52. This provides the end users with secure, backed up copies that are easily accessed, yet are in a location that may be outside the office.

In addition to back up purposes, system 51 can provide a program 20 to track and audit modifications made to files. Tracking and auditing changes allow system 51 to be able to identify who made the modifications and when they occurred. System 51 would also be able to determine what kinds of modifications were made.

Further, program 20 can write updated and encrypted data files to a database, which may or may not be remote, whereby multiple offices having access to said database will now have the most recent versions of data files.

Although the invention has been described with reference to a particular arrangement of parts, features, and the like, these are not intended to be exhaust all possible arrangements of features, and indeed many other modifications and variations will be ascertainable to those of skill in the art.

What is claimed is:

1. A system for encrypting data files, comprising:
   a computer;
   a storage device connected to said computer;
   an application loaded on said computer for storing and retrieving data files on said storage device;
   a program executing on said computer, independently of said application, for intercepting said data files to be stored by the application on said storage device to encrypt them before they are stored;
   said program includes an encrypt key for encrypting and decrypting data files and an application identifier for specifying which application to launch; and
   wherein said encrypt key and application identifier are stored together in an encrypted file on said storage device.

2. The system of claim 1, wherein said program intercepts data files to be retrieved by said application from said storage device to decrypt them.

3. The system of claim 2, wherein said program decrypts said data files retrieved by said application in memory.

4. The system of claim 3, wherein said program does not store unencrypted versions of the encrypted data files on said storage device.

5. The system of claim 1, wherein said program encrypts said data files automatically without user intervention.

6. The system of claim 1, wherein said program decrypts said data files automatically without user intervention.

7. The system of claim 1, wherein said encrypted file is encrypted with a passkey selected from a group of passkeys.

8. The system of claim 7, wherein said program decrypts said encrypted file with said passkey.

9. The system of claim 1, wherein said encrypted file is encrypted with a passkey generated from a feature of the encrypted file.

10. The system of claim 9, wherein said feature is a size of the encrypted file.

11. The system of claim 9, wherein said feature is a time the encrypted file is created.

12. The system of claim 9, wherein said feature is a date the encrypted file is created.

13. The system of claim 1, wherein said encrypted file is encrypted with a passkey having more than one component.

14. The system of claim 1, wherein said program causes said application to execute on said computer.

15. The system of claim 1, wherein said program decrypts said data files with said encrypt key.

16. A method for encrypting a file comprising the steps of:
   generating a file based on specified parameters;
   varying a size of the file;
   selecting a passkey component from a list of possible passkey components;
   combining the file size and the passkey component to form a passkey; and
   using the passkey to encrypt the file.

17. The method of claim 16, further comprising the additional step of noting a date the file was generated.

18. The method of claim 16, further comprising the additional step of noting a time the file was generated.

* * * * *